United States Patent
Koehler et al.

(10) Patent No.: US 6,752,445 B1
(45) Date of Patent: Jun. 22, 2004

(54) ELECTRICAL CONNECTOR SYSTEM FOR A VEHICLE SEAT ASSEMBLY

(75) Inventors: David F. Koehler, Lake Orion, MI (US); Jeffrey S. Campbell, West Bloomfield, MI (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/382,277

(22) Filed: Mar. 5, 2003

(51) Int. Cl.$^7$ .......................... B60N 2/10; H01R 13/453
(52) U.S. Cl. .............................. 296/65.05; 296/65.01; 439/131
(58) Field of Search .......................... 296/65.01, 65.03, 296/65.05, 65.09, 65.13; 439/131, 135, 136

(56) References Cited

U.S. PATENT DOCUMENTS

| | | | | |
|---|---|---|---|---|
| 6,050,835 A | * | 4/2000 | Henrion et al. | 439/247 |
| 6,250,703 B1 | * | 6/2001 | Cisler et al. | 296/65.03 |
| 6,267,430 B1 | * | 7/2001 | Cresseaux | 296/65.13 |
| 6,485,080 B2 | * | 11/2002 | Hansen et al. | 296/65.03 |
| 6,663,157 B1 | * | 12/2003 | Hofmann et al. | 296/65.03 |

* cited by examiner

*Primary Examiner*—D. Glenn Dayoan
*Assistant Examiner*—Greg Blankenship
(74) *Attorney, Agent, or Firm*—Stacey E. Caldwell

(57) ABSTRACT

An electrical connector system is provided for a vehicle seat assembly which includes a seat frame movably mounted to a floor of a vehicle for movement between a raised position and a lowered position. The system includes a first connector mounted to the vehicle floor. A second connector is mounted to the seat frame and is mateable with the first connector. The second connector includes a protective shroud fixed to the seat frame and a mating portion movably mounted in the protective shroud. A motion linkage is connected between the mating portion of the second connector and the vehicle seat assembly for moving the mating portion from a protective position within the protective shroud to an exposed position for mating with the first connector, automatically in response to movement of the seat frame from its raised position to its lowered position.

21 Claims, 9 Drawing Sheets

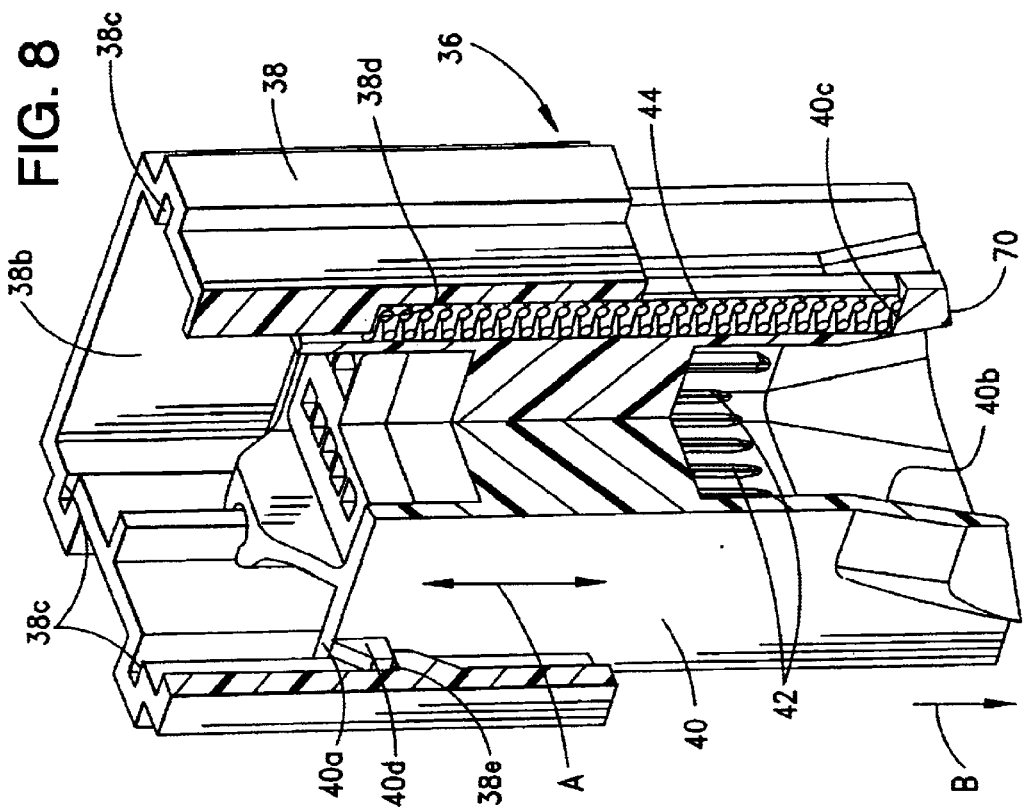
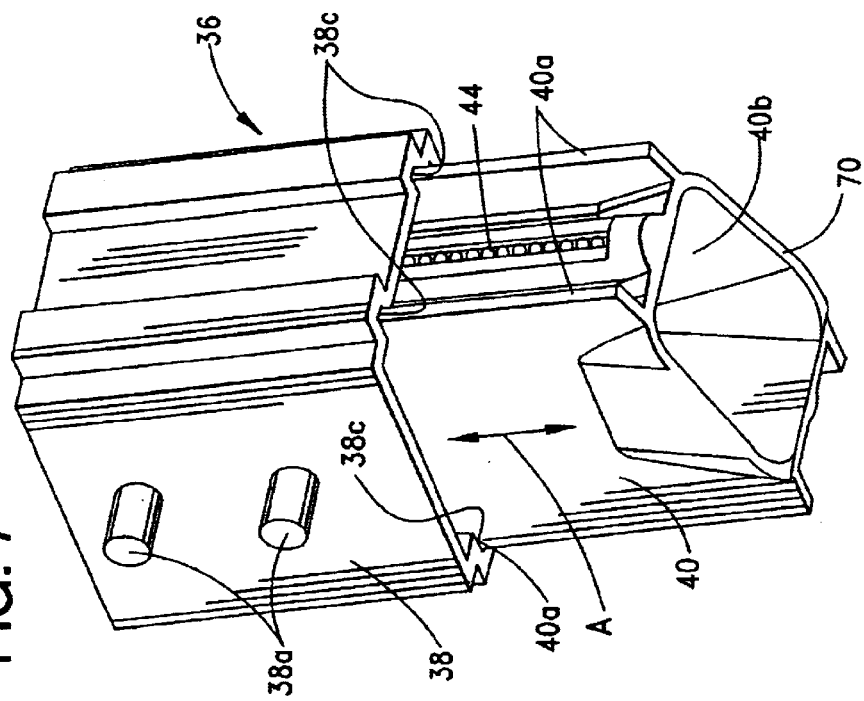

ELECTRICAL CONNECTOR SYSTEM FOR A VEHICLE SEAT ASSEMBLY

BACKGROUND OF THE INVENTION

This invention generally relates to the art of electrical connectors and, particularly, to an electrical connector system for a vehicle seat assembly which is movable into and out of a vehicle.

With the current popularity of sports utility vehicles in the automotive industry, removable vehicle seats have become quite common. A vehicle seat assembly typically includes some form of seat frame which is movably mounted to a floor of the vehicle and is movable into and out of the vehicle between raised and lowered positions. These seats often include electrically powered components such as power adjustment mechanisms, seat heaters or the like. Consequently, electrical connectors must be interengaged or mated when the seat is mounted in the vehicle. In addition, connectors are used as sensors for detecting the locking of safety belts, the actuation of air bags or the like. Again, mating electrical connectors are used for these and other purposes.

One of the principal problems with electrical connector systems for vehicle seat assemblies as described above, is protecting the mateable electrical connectors when the connectors are not mated. In other words, the connectors typically are exposed while the seat is being installed in the vehicle and when it is removed therefrom. The exposed connectors can be struck by extraneous objects and damaged. It is also desirable for these connectors to be mated and unmated automatically when the seat is installed or removed from the vehicle.

In addition, the seat assembly must absorb tolerances during interconnection due to the seat mass, itself, and the loading forces it generates. Misalignment of the connectors during mating can cause excessive wear and premature system failure. The present invention is directed to solving these various problems.

SUMMARY OF THE INVENTION

An object, therefore, of the invention is to provide a new and improved electrical connector system for a vehicle seat assembly, such as an assembly which includes a seat frame movably mounted to a floor of a vehicle for movement between a raised position to a lowered or installed position.

In the exemplary embodiment of the invention, the electrical connector system includes a first connector mounted to the floor of the vehicle. A second connector is mounted to the seat frame and is mateable with the first connector when the frame is in its lowered or installed position. The second connector includes a protective shroud fixed to the seat frame.

A mating portion of the connector is movably mounted on the protective shroud for movement between a protective position within the shroud and an exposed position at least partially outside the shroud for mating with the first electrical connector. A motion linkage is provided between the mating portion of the second electrical connector and the vehicle seat assembly for moving the mating portion from its protective position to its exposed position automatically in response to movement of the seat frame from its raised position to its lowered position.

According to one aspect of the invention, the seat frame is mounted for pivotal movement between the raised and lowered positions. The mating portion of the second electrical connector is mounted for substantially linear movement on the protective shroud. The motion linkage includes a link structure for converting pivotal movement of the seat frame to substantially linear movement of the mating portion. In the exemplary embodiment herein, the vehicle seat assembly includes a fixed mounting bracket to which the seat frame is pivotally mounted. The link structure includes a first link arm having one end pivotally connected to the mounting bracket and a second link arm having one end pivotally connected to the mating portion of the second electrical connector. Opposite ends of the first and second link arms are mutually pivotally connected.

According to another aspect of the invention, the first connector on the floor of the vehicle includes a cover normally positioned over at least a mating face of the connector. The cover is engageable by the second connector to move the cover away from the mating face during mating of the connectors. The mating portion of the second electrical connector includes an angled surface for engaging and moving the cover which is pivotally mounted on the first connector. Spring means are provided operatively associated with the cover for biasing the cover toward the first position.

Other features of the invention include the protective shroud of the second connector including an elongated interior cavity within which the mating portion of the second connector is substantially linearly movable. Guide pins on the mating portion extend into elongated guide slots disposed in the protective shroud to guide the mating portion in its substantially linear movement relative to the shroud. Spring means are provided to bias the mating portion toward its exposed position.

Other objects, features and advantages of the invention will be apparent from the following detailed description taken in connection with the accompanying drawings.

BRIEF DESCRIPTION OF THE DRAWINGS

The invention, together with its objects and the advantages thereof, may be best understood by reference to the following description taken in conjunction with the accompanying drawings, in which like reference numerals identify like elements in the figures and in which:

FIG. 7 is a perspective view of the mating portion of FIG. 6, taken at a different angle thereto;

FIG. 8 is a vertical section through the mating portion as seen in FIG. 7;

DETAILED DESCRIPTION OF THE PREFERRED EMBODIMENT

Figure 1:
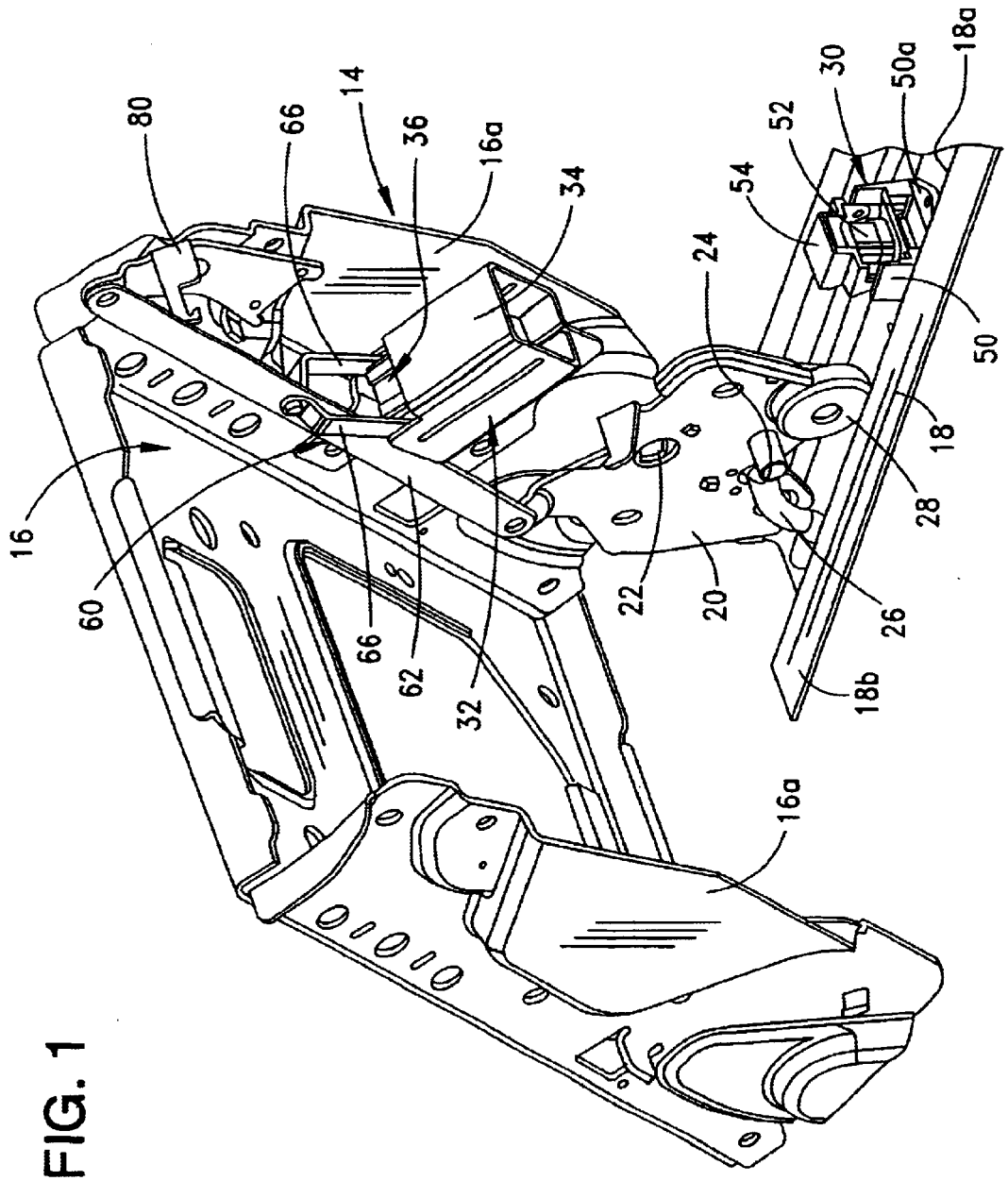
FIG. 1 is a perspective view of a vehicle seat assembly incorporating the electrical connector system of the invention, with the seat assembly in its raised position.

Referring to the drawings in greater detail, and first to FIGS. 1 and 2, the invention is embodied in an electrical connector system for a vehicle seat assembly, generally designated 14, which includes a seat frame, generally designated 16, that is movably mounted to a floor of a vehicle for movement between a raised position shown in FIGS. 1 and 2, to a lowered or installed position shown in FIG. 4 and described hereinafter.

The seat, itself, is not shown in the drawings but, as is known in the art, typically is an upholstered structure secured to the top of seat frame 16. The floor of the vehicle also is not shown in the drawings, but a mounting rail 18 is shown to include a trough 18a within which the vehicle seat assembly and a floor connector of the invention are mounted. The mounting rail 18 typically is fixed to and recessed in the floor, with side flanges 18b flush with the floor. Although only one mounting rail 18 is shown in the drawings, two such rails are provided beneath a pair of opposite side walls 16a of seat frame 16.

Figure 2:
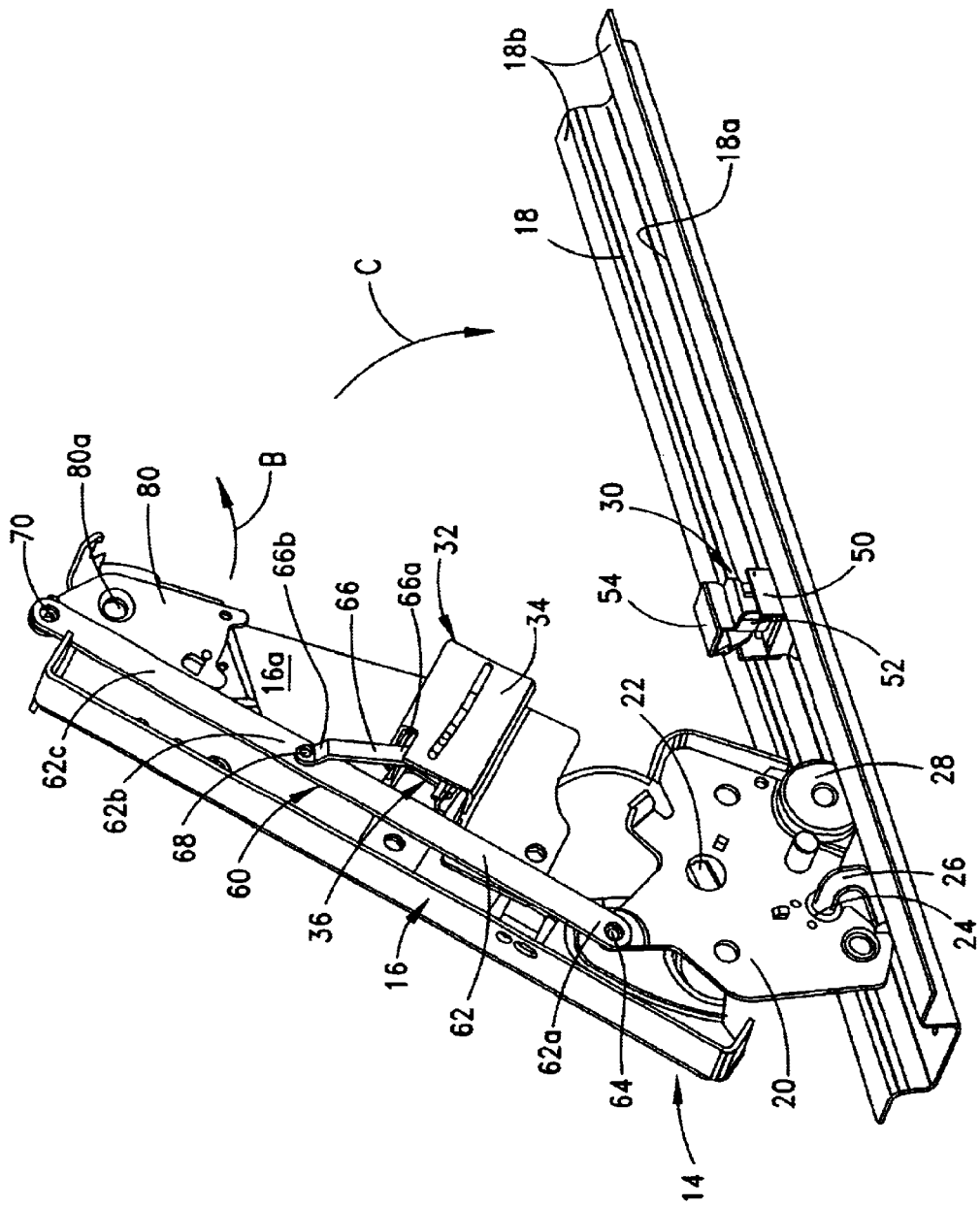
FIG. 2 is a vertical section through the assembly of FIG. 1 and taken at a different angle thereto.

Before proceeding to the electrical connector system of the invention, and still referring to FIGS. 1 and 2, seat assembly 14 includes a mounting bracket 20 to which seat frame 16 is pivotally mounted, as at 22. When the seat assembly is lowered into the vehicle, a recess 24 in the mounting bracket 20 is positioned over a pivot arm 26 fixed within mounting rail 18. The mounting bracket will pivot slightly about the pivot arm 26 until a wheel 28 engages the bottom of mounting rail 18. A front latch 80 is pivotally mounted to the side wall 16a of the seat frame 16, as at 80a. When the seat assembly is lowered to its installed position as described hereinafter, front latch 80 is pivoted into latching engagement with a complementary latch (not shown) on the floor of the vehicle. Wheel 28 is provided simply for rolling the entire vehicle seat assembly out of mounting rail 18 and to the edge of the vehicle from which the seat assembly is to be removed. A second mounting bracket and wheel are provided at the opposite side of the seat frame 16 on the opposite side wall 16a, but which is not shown in the drawings.

The electrical connector system of the invention includes a first electrical connector or floor connector, generally designated 30, which is mounted to the floor of the vehicle. In the embodiment of the invention herein, the floor connector 30 is shown mounted within mounting rail 18, but it is to be understood that in other applications, the floor connector could be mounted directly to the floor of the vehicle. The electrical connector system of the invention includes a second electrical connector or seat connector, generally designated 32. The seat connector is mounted to side wall 16a of seat frame 16 and includes a mating portion as described hereinafter. The seat connector 32 is mateable with the floor connector 30 as seen in FIG. 4 when the seat frame 16 is pivoted from its raised position shown in FIGS. 1 and 2 to its lowered or installed position shown in FIG. 4. The complete mating operation of the electrical connector system will be described hereinafter.

Figure 3:
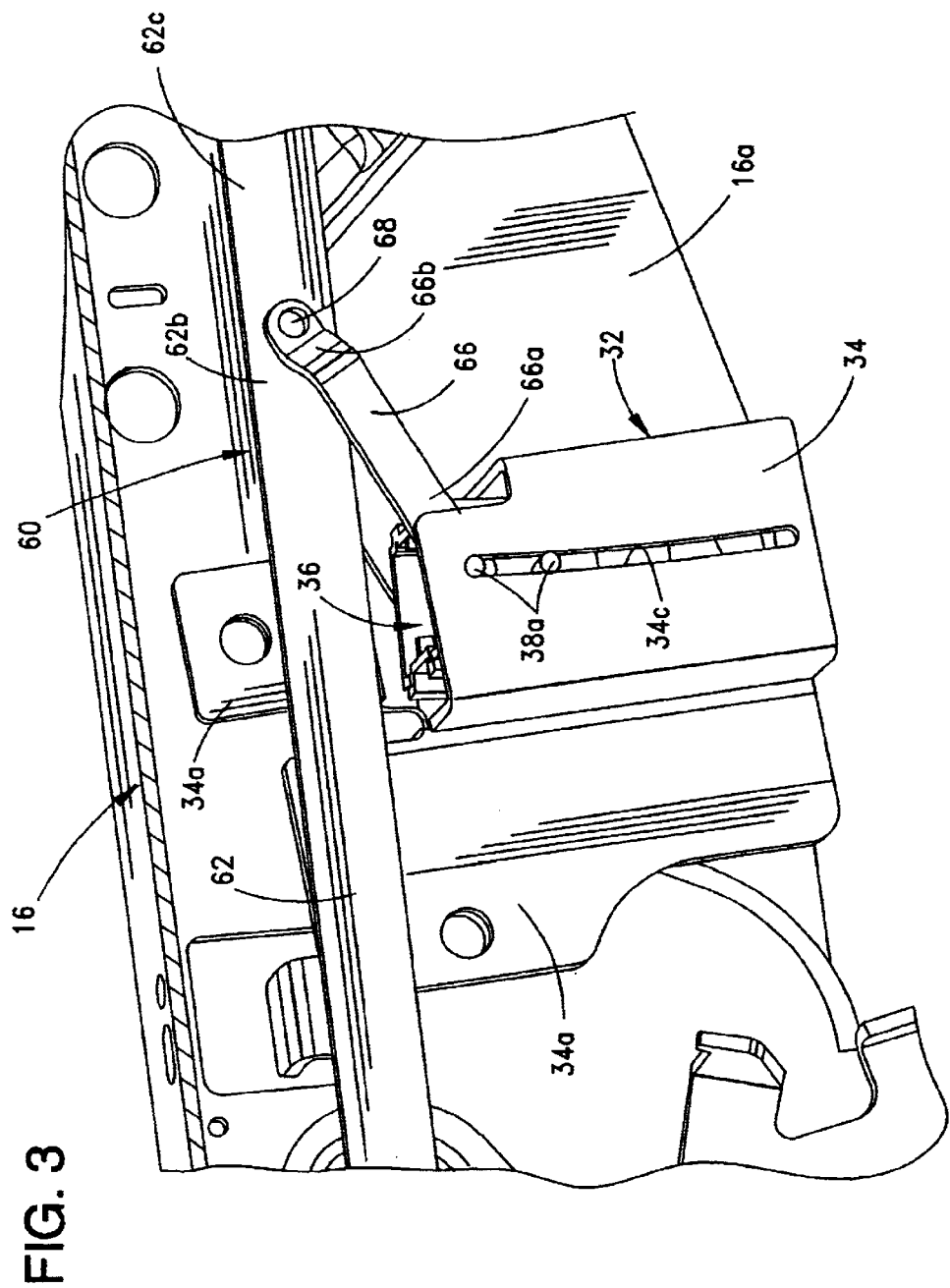
FIG. 3 is a fragmented and sectioned perspective view showing the seat connector in its raised or protective position.

FIG. 3 shows an enlarged depiction of seat connector 32 mounted to side wall 16a of seat frame 16. Generally, the seat connector includes a protective outer shroud 34 within which an inner mating portion, generally designated 36, is movably mounted. FIG. 3 shows mating portion 36 substantially entirely hidden within shroud 34 so that the mating portion is completely protected when the seat frame 16 is in its raised position shown in FIGS. 1–3. When the seat frame 16 is moved to its lowered or installed position, the connector mating portion 36 is moved out of the bottom of the protective shroud 34 for mating with floor connector 30 as seen in FIG. 4.

Figure 5:
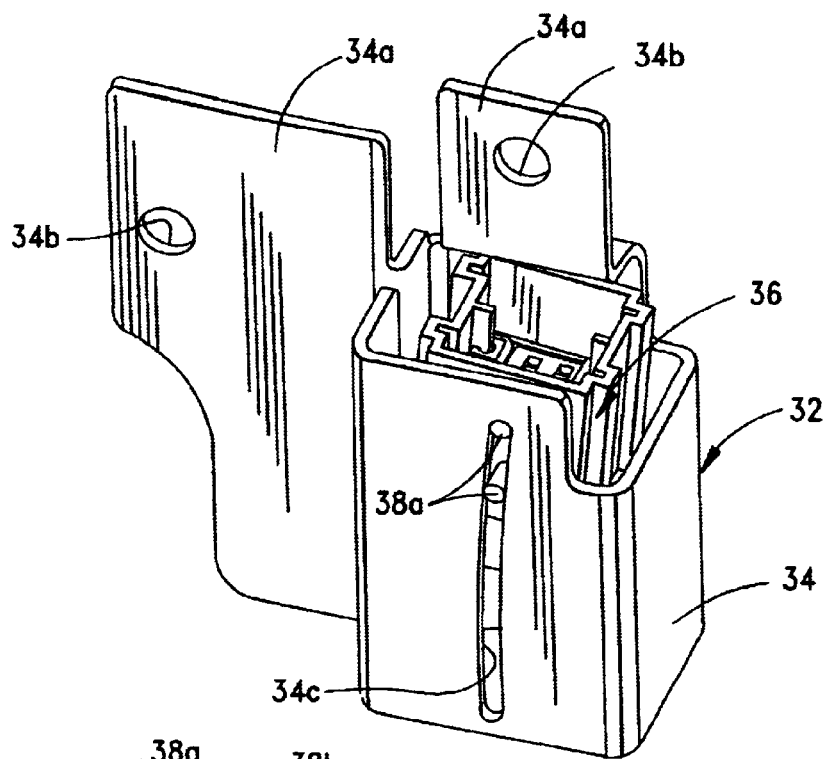
FIG. 5 is a perspective view of the seat connector removed from the vehicle seat assembly.

FIG. 5 is an isolated depiction of the seat connector 32, including outer protective shroud 34 and inner mating portion 36. The connector mating portion 36 is linearly movable within an elongated interior cavity 37 in outer protective shroud 34. The outer protective shroud 34 may be stamped and formed from sheet metal material and includes a pair of mounting flanges 34a having holes 34b through which appropriate fasteners are inserted to secure the protective shroud to side wall 16a of seat frame 16. The fasteners are not shown in the drawings, but may be such fasteners as screws, bolts, rivets or the like. The shroud 34 also has an elongated, substantially linear guide slot 34c in opposite side walls thereof. The guide slot 34c is described as being "substantially" linear or straight. However, in the drawings, it can be seen that the guide slot 34c has a very slight curve which is provided to prevent binding and which counteracts angular motion of the seat during movement of mating portion 36 within the protective shroud 34.

Figure 6:
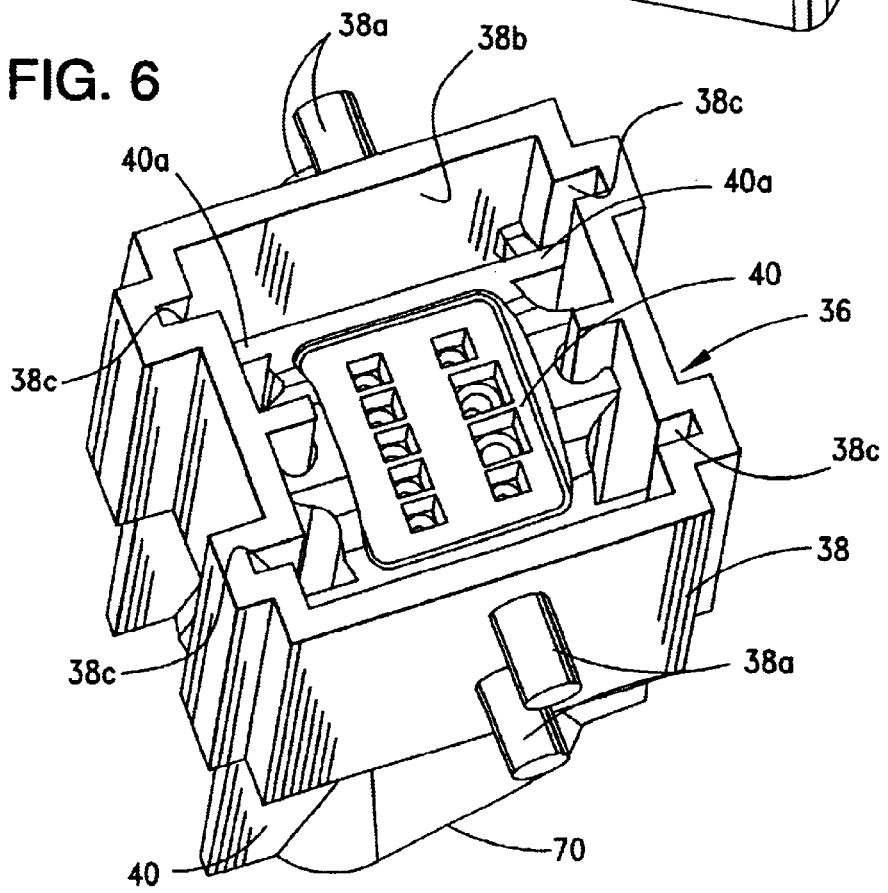
FIG. 6 is a perspective view of the mating portion of the seat connector removed from the protective shroud therefor.

FIGS. 6–8 show mating portion 36 of seat connector 32 in greater detail. Specifically, the mating portion includes an outer housing 38 which may be molded of dielectric material such as plastic. The outer housing includes a pair of guide projections or pins 38a which project outwardly from opposite sides thereof for insertion into guide grooves 34c in outer protective shroud 34 as seen in FIG. 5. A terminal module 40 is mounted for reciprocal movement within an interior cavity 38b of outer housing 38. The terminal module has four flanges 40a which ride in four guide slots 38c within interior cavity 38b of the outer housing. The terminal module mounts a plurality of terminals which include terminal pins 42 (FIG. 8) exposed within a receptacle 40b at the bottom of the terminal module.

The terminal module 40 is mounted within interior cavity 30b of outer housing 38 for reciprocal movement in the direction of double-headed arrows "A" (FIGS. 7 and 8). A coil spring 44 biases the terminal module downwardly in the direction of arrow "B" (FIG. 8). The coil spring is compressed between a shoulder 38d within interior cavity 38b of the outer housing and a shoulder 40c on the terminal module. A stop boss 40d (FIG. 8) on the outside of the terminal module is engageable with a stop shoulder 38e on the inside of outer housing 38 to define the extreme limit position of the terminal module. In essence, the assembly of mating portion 36, including spring 44, creates a spring loading of the (second) seat connector 32 to provide impact protection when the seat connector is mated with the floor (first) connector 30.

Figure 9:
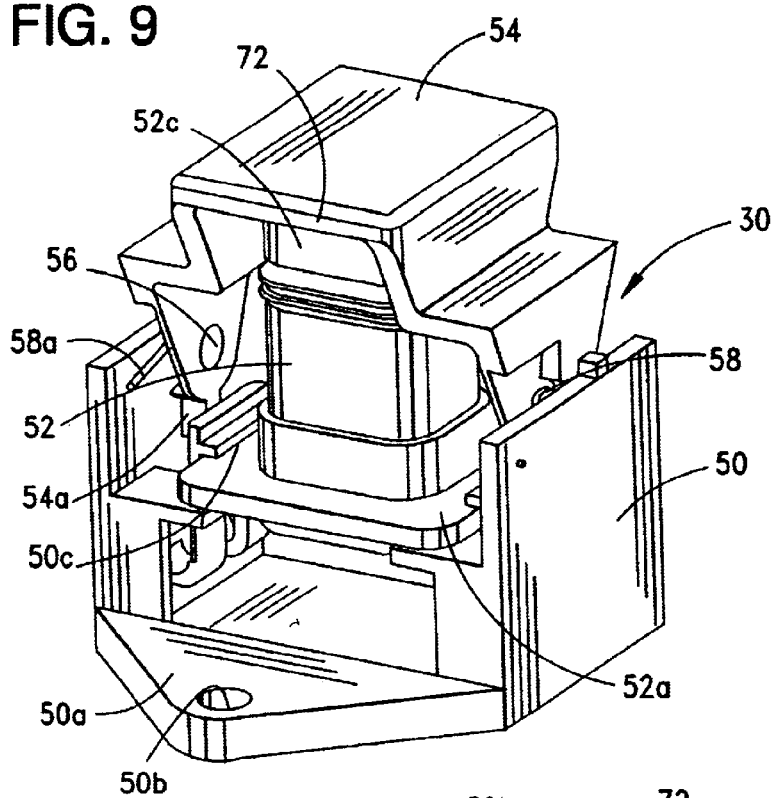
FIG. 9 is a perspective view of the floor connector with the protective cover in position over the connector.
Figure 10:
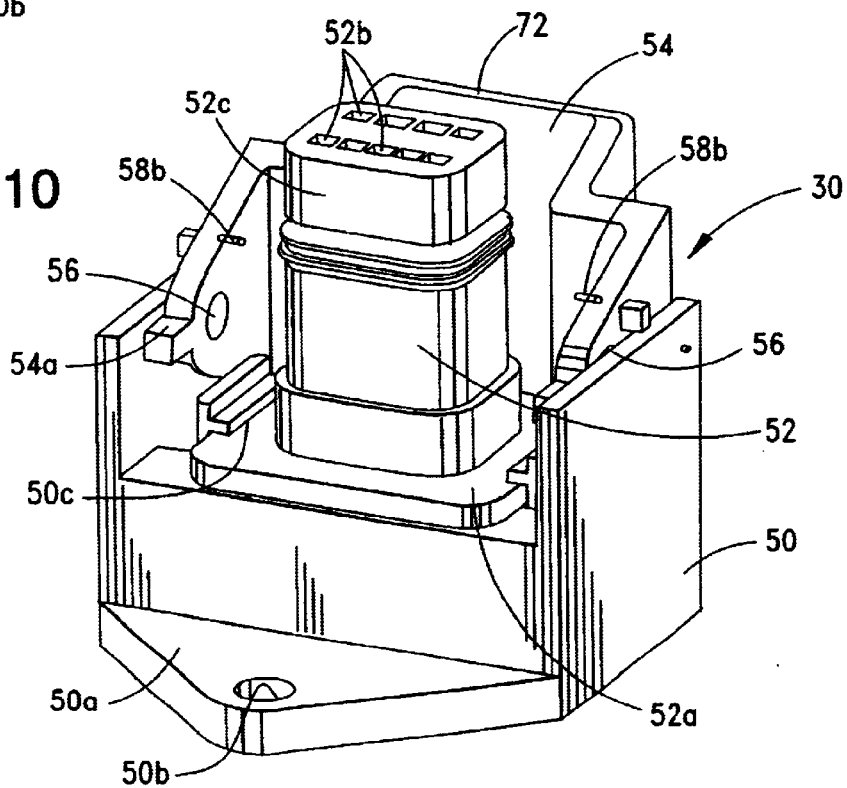
FIG. 10 is a view similar to that of FIG. 9, but showing the protective cover pivoted to expose the connector.

FIGS. 9 and 10 show the floor connector 30 in greater detail. The floor connector includes a mounting bracket 50 with a pair of flanges 50a provided with fastening holes 50b for receiving appropriate fasteners (not shown) for mounting the floor connector within the bottom of mounting rail 18 as seen in FIGS. 1 and 2. Although the floor connector is shown in the drawings as a separate element, it will be understood that the floor connector may be integrated into the mounting rail 18, the floor of the vehicle or some other component that is permanently fixed to the vehicle floor. A connector plug 52 of dielectric material is mounted within bracket 50 by means of a base plate 52a of the plug being press-fit within a pair of grooves 50c inside mounting bracket 50. As seen best in FIG. 10, connector plug 52 includes a plurality of terminal pin-receiving passages 52b for receiving terminal pins 42 (FIG. 8) when seat connector 32 is mated with floor connector 30.

During mating, a top mating end 52c of connector plug 52 is inserted into receptacle 40b (FIG. 8) of terminal module 40 of the seat connector. Appropriate female terminals (not visible in the drawings) are mounted within connector plug 52 of floor connector 30. Appropriate leads and wiring from the terminals of seat connector 32 and floor connector 30 are not shown in the drawings but, as is known to one skilled in this art, the leads and wiring will interconnect the terminals of the connectors to appropriate controls of the vehicle.

Still referring to FIGS. 9 and 10, a protective cover 54 is pivotally mounted by pivot shafts 56 to the inside of mounting bracket 50. The cover is movable between a protecting position over the top of connector plug 52 as shown in FIG. 9, to an open position shown in FIG. 10. The cover is moved to its open position by engagement with seat connector 32, as described hereinafter. The cover has a pair of stop projections 54a for engaging appropriate stop shoulders (not visible in the drawings) on the inside of mounting bracket 50 to define the protective position of FIG. 9. A pair of springs 58 are wrapped around pivot shafts 56, with one end 58a of each spring fixed to the inside of mounting bracket 50 and an opposite end 58b of each spring being fixed to cover 54. The springs are torsion springs for biasing the cover toward its protective position shown in FIG. 9.

Generally, and referring back to FIGS. 1–4, a motion linkage, generally designated 60, is provided between mating portion 36 of seat connector 32 and mounting bracket 20 of vehicle seat assembly 14 for moving the mating portion from its protective position within shroud 34 as seen in FIGS. 1–3, to its exposed or mating position shown in FIG. 4. This movement of the mating portion is effected by motion linkage 60 automatically when seat frame 16 is moved from its raised position shown in FIGS. 1–3 to its lowered or installed position shown in FIG. 4.

More particularly, motion linkage 60 includes a link structure which converts pivotal movement of seat frame 16 to substantially linear movement of mating portion 36 of seat connector 32. The link structure includes a first link arm 62 having one end 62a pivotally mounted to mounting bracket 20, as at 64. A second link arm 66 has one end 66a pivotally connected to mating portion 36 of seat connector 32. Actually, as seen in FIG. 1, two second link arms 66 are provided at opposite sides of the mating portion 36 and the first link arm 62. An opposite end 62b of the first link arm is pivotally connected to an opposite end 66b of the second link arm(s), as at 68.

For purposes of moving mating portion 36 of seat connector 32, first link arm 62 could terminate at opposite "end" 62b. However, as best seen in FIG. 2, first link arm 62 extends beyond second link arm(s) 66 to form an extension 62c which is pivotally connected to front latch 30, as at 70. When seat frame 16 is moved down toward its lowered or installed position, front latch 30 is pivoted about pivot point 30a in the direction of arrow "B" for latchingly engaging the appropriate latch (not shown) on the vehicle floor.

Figure 11:
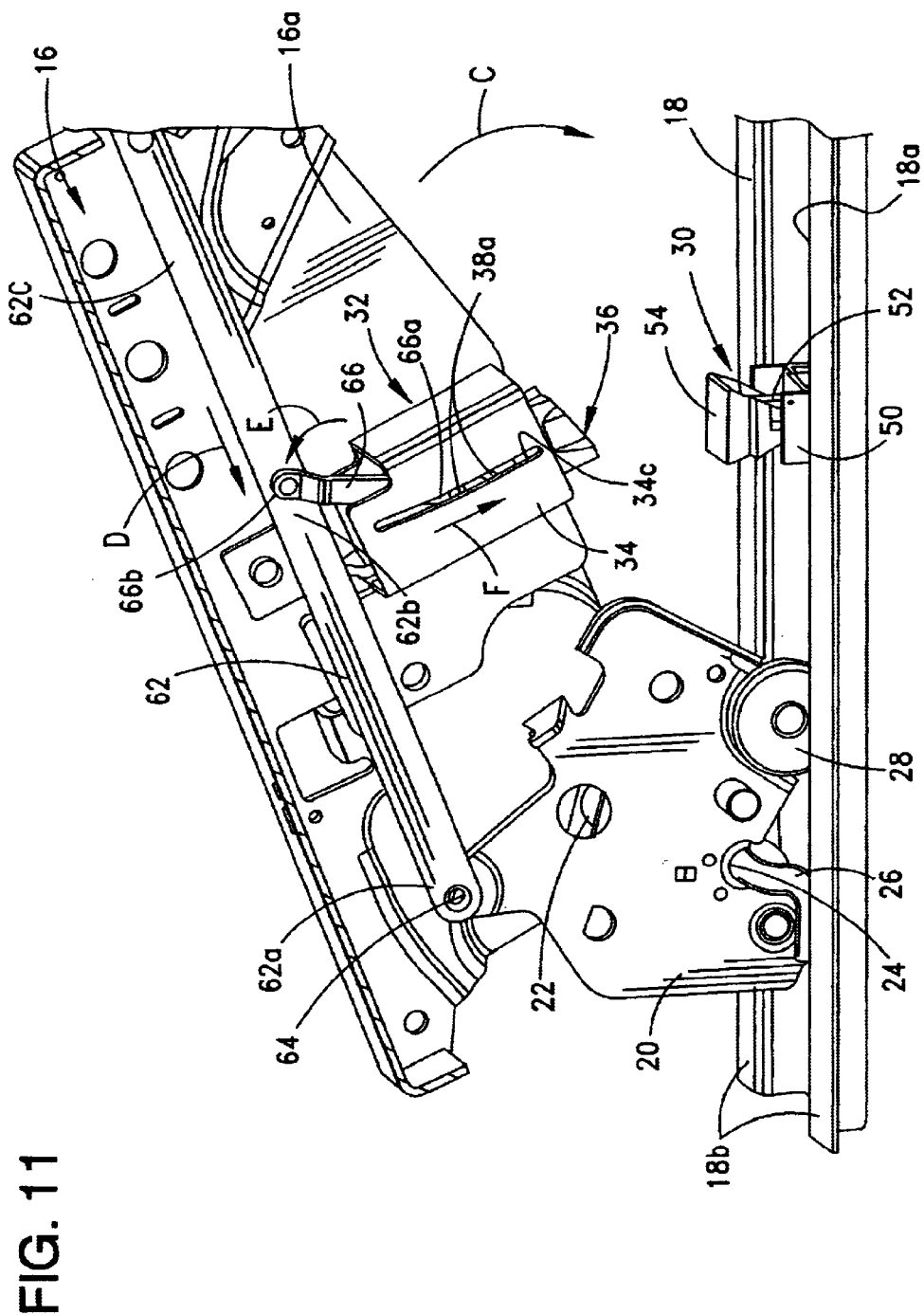
FIG. 11 is a view similar to that of FIG. 2, showing the vehicle seat assembly approximately one-half the distance between its raised and lowered positions; and, FIG. 12 is a view similar to that of FIG. 11, with the vehicle seat assembly shown engaging and partially moving the protective cover of the floor connector.

The operation of the electrical connector system of the invention now will be described in relation to FIGS. 1, 2, 4, 11 and 12. As stated above, FIGS. 1 and 2 show the electrical connector system with seat frame 16 of vehicle seat assembly 14 in its raised position, as when the vehicle seat is initially being positioned in the vehicle. Once recess 24 of mounting bracket 20 is positioned over pivot arm 26, vehicle seat 16 is pivoted downwardly about pivot point 22 with mounting bracket 20, in the direction of arrows "C" (FIGS. 2 and 11). In FIG. 2, it can be seen that mating portion 36 is substantially concealed and protected within shroud 34 of seat connector 32. As the seat frame 16 is pivoted downwardly, first link arm 62 is pivoted downwardly therewith, but about a different pivot point 64 which is located above pivot point 22. Therefore, the opposite end link arm 62b moves rearwardly in the direction of arrow "D" (FIG. 11). This causes the top end 66b of second link arm 66 to move rearwardly relative to the seat frame in the direction of arrow "E", as opposite end 66a pushes mating portion 36 downwardly in the direction of arrow "F" as seen in FIG. 11. The downward movement of the mating portion is defined by the substantially linear movement of pins 38a within substantially linear guide slots 34c in protective shroud 34.

With the link structure of link arms 62 and 66, during pivotal movement of seat frame 16, while link arm 62 strictly pivots relative to mounting bracket 20, the link arm 66 both pivots and moves along its length relative to seat connector 32. In addition, second link arm 66 moves both in a pivoting and linear translating movement with both link arm 62 and movable mating portion 36. The result is that the motion linkage 60, comprised of link arms 62 and 66, is effective to convert pivotal movement of seat frame 16 into substantially linear movement of mating portion 36 of seat connector 32.

Figure 4:
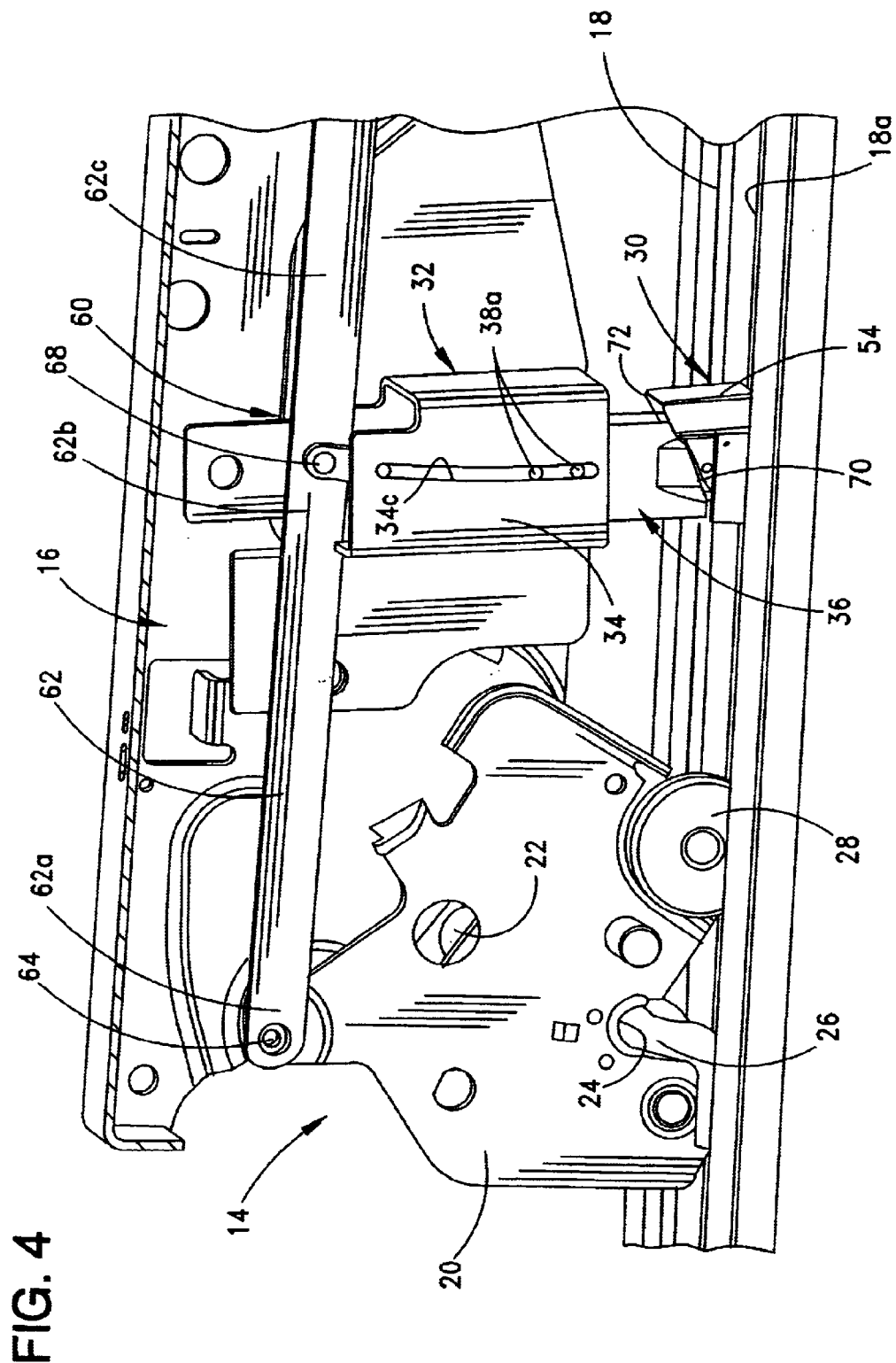
FIG. 4 is a view somewhat similar to FIG. 3, with the vehicle seat assembly in its lowered or installed position and with the seat connector mated with the floor connector.

FIG. 11 shows seat frame 16 approximately one-half the distance between its raised position of FIGS. 1 and 2 to its fully lowered or installed position shown in FIG. 4. It can be seen in FIG. 11 that mating portion 36 of seat connector 32 has begun to become exposed outside the bottom of protective shroud 34.

Figure 12:
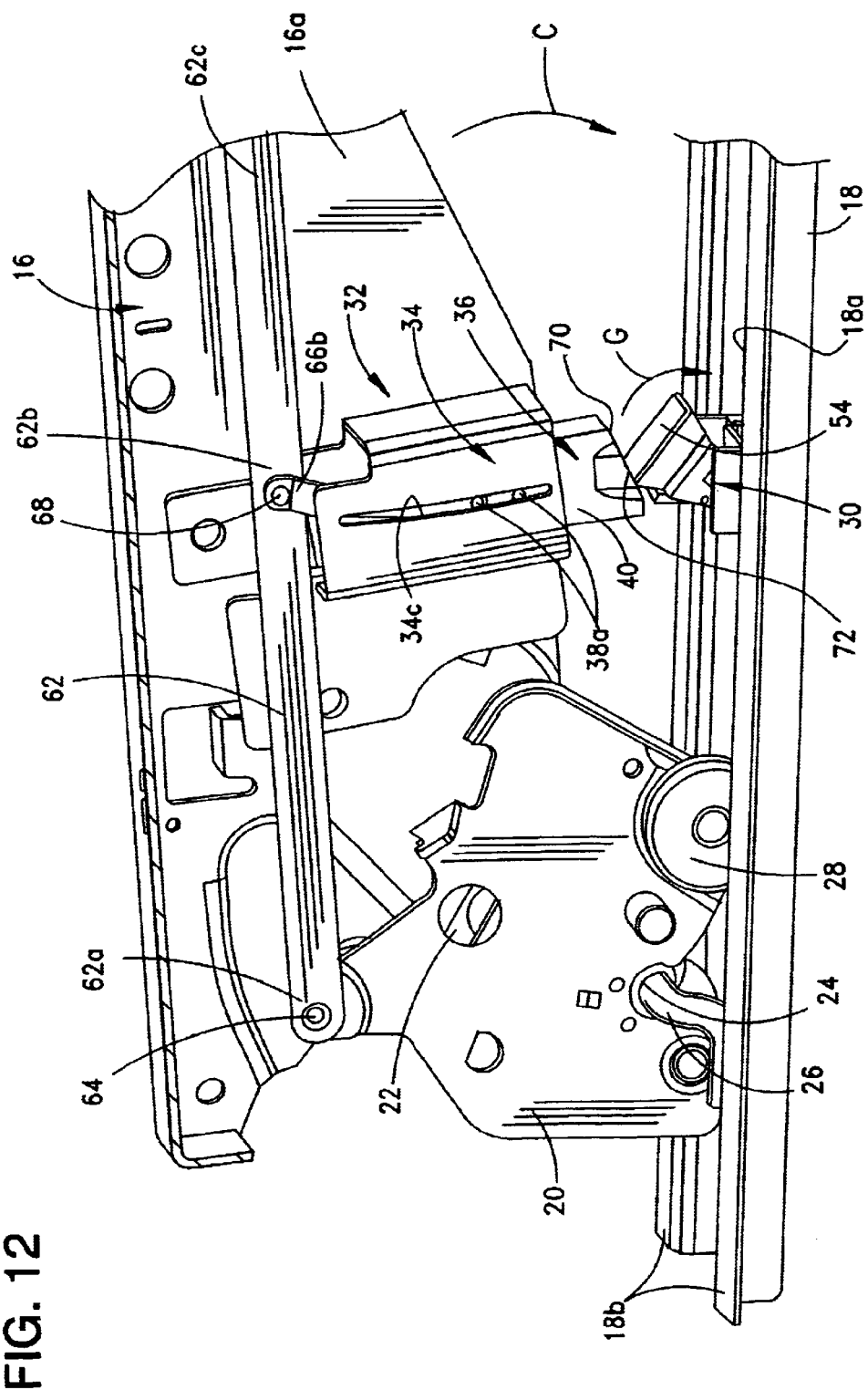

FIG. 12 shows seat frame 16 having been lowered further in the direction of arrow "C" until mating portion 36 of seat connector 32 has engaged cover 54 of floor connector 30. Actually, the bottom of terminal module 40 of mating portion 36 is provided with an angled surface 70 which engages a front lip 72 of cover 54. The angled surface biases the cover in the direction of arrow "G" from its closed position (FIG. 9) to its open position shown in FIGS. 4 and 10. In its open position, the cover exposes connector plug 52 (FIG. 10) so that it can move into receptacle 40b (FIG. 8) of terminal module 40 to electrically connect seat connector 32 and floor connector 40. FIG. 4 shows the seat connector and floor connector fully mated in the lowered or installed position of seat frame 16.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An electrical connector system for a vehicle seat assembly including a seat frame movably mounted to a floor of a vehicle for movement between a raised position and a lowered position, comprising:

a first connector mounted to the floor of the vehicle;

a second connector mounted to the seat frame and mateable with the first connector when the seat frame is in said lowered position, the second connector including a protective shroud fixed to the seat frame, and a mating portion movably mounted on the protective shroud for movement between a protective position within the shroud and an exposed position at least partially outside the shroud for mating with the first connector; and, a motion linkage extending between the mating portion of the second connector and the vehicle seat assembly for moving the mating portion from its protective position to its exposed position automatically in response to movement of said seat frame from said raised position to said lowered position.

2. The electrical connector system of claim 1, wherein said seat frame is mounted for pivotal movement between said raised and lowered positions, said second connector mating portion is mounted for substantially linear movement on said protective shroud, and said motion linkage includes a link structure for converting pivotal movement of said seat frame to substantially linear movement of said second connector mating portion.

3. The electrical connector system of claim 2, wherein said vehicle seat assembly includes a fixed mounting bracket to which said seat frame is pivotally mounted, and said link structure includes a first link arm having one end pivotally connected to said mounting bracket and a second link arm having one end pivotally connected to said second connector mating portion, with opposite ends of the first and second link arms being mutually pivotally connected.

4. The electrical connector system of claim 1, including guide means facilitating mounting the mating portion of said second connector for substantially linear movement on and relative to said protective shroud.

5. The electrical connector system of claim 4, wherein said guide means includes an elongated guide slot disposed in said protective shroud and at least one guide projection extending from said second connector mating portion into said elongated slot.

6. The electrical connector system of claim 1, wherein said protective shroud includes an elongated interior cavity within which said second connector mating portion is substantially linearly movable between said protective and exposed positions.

7. The electrical connector system of claim 1, including spring means for spring-loading said second connector mating portion to bias it toward said exposed position.

8. The electrical connector system of claim 1, wherein said first connector includes a cover normally positioned over at least a mating face of said first connector and engageable by said second connector to move the cover away from said mating face during mating of said first and second connectors.

9. The electrical connector system of claim 8, wherein said second connector mating portion includes an angled surface for engaging and moving said cover.

10. The electrical connector system of claim 8, wherein said cover is mounted on said first connector for movement between a first position covering said mating face and a second position exposing the mating face.

11. The electrical connector system of claim 10, wherein said cover is pivotally mounted on said first connector for pivotal movement between the first and second positions.

12. The electrical connector system of claim 10, wherein said second connector mating portion includes an angled surface for engaging and moving said cover.

13. The electrical connector system of claim 10, including spring means operatively associated with said cover for biasing said cover toward said first position.

14. The electrical connector system of claim 4, wherein said guide means includes an arcuate extent and which extends in a direction opposite a direction of movement of said seat frame moving from said raised position to said lowered position.

15. The electrical connector system of claim 14, wherein said guide means includes a track formed in said protective shroud.

16. The electrical connector system of claim 8, wherein said second connector mating portion includes an alignment post that engages and moves said cover.

17. An electrical connector system for a vehicle seat assembly including a seat frame movably mounted to a floor of a vehicle for movement between a raised position and a lowered position, comprising:

a first connector mounted to the floor of the vehicle;

a second connector mounted to the seat frame and mateable with the first connector when the seat frame is in said lowered position; and, a cover normally positioned over at least a mating face of said first connector and engageable by the second connector to move the cover away from said mating face during mating of the connectors.

18. The electrical connector system of claim 17, wherein said second connector includes an angled surface for engaging and moving said cover.

19. The electrical connector system of claim 17, wherein said cover is mounted on said first connector for movement between a first position covering said mating face and a second position exposing said mating face.

20. The electrical connector system of claim 19, wherein said second connector includes an angled surface for engaging and moving said cover.

21. The electrical connector system of claim 19, further including spring means operatively associated with said cover for biasing said cover toward said first position.

* * * * *